Figure 1:
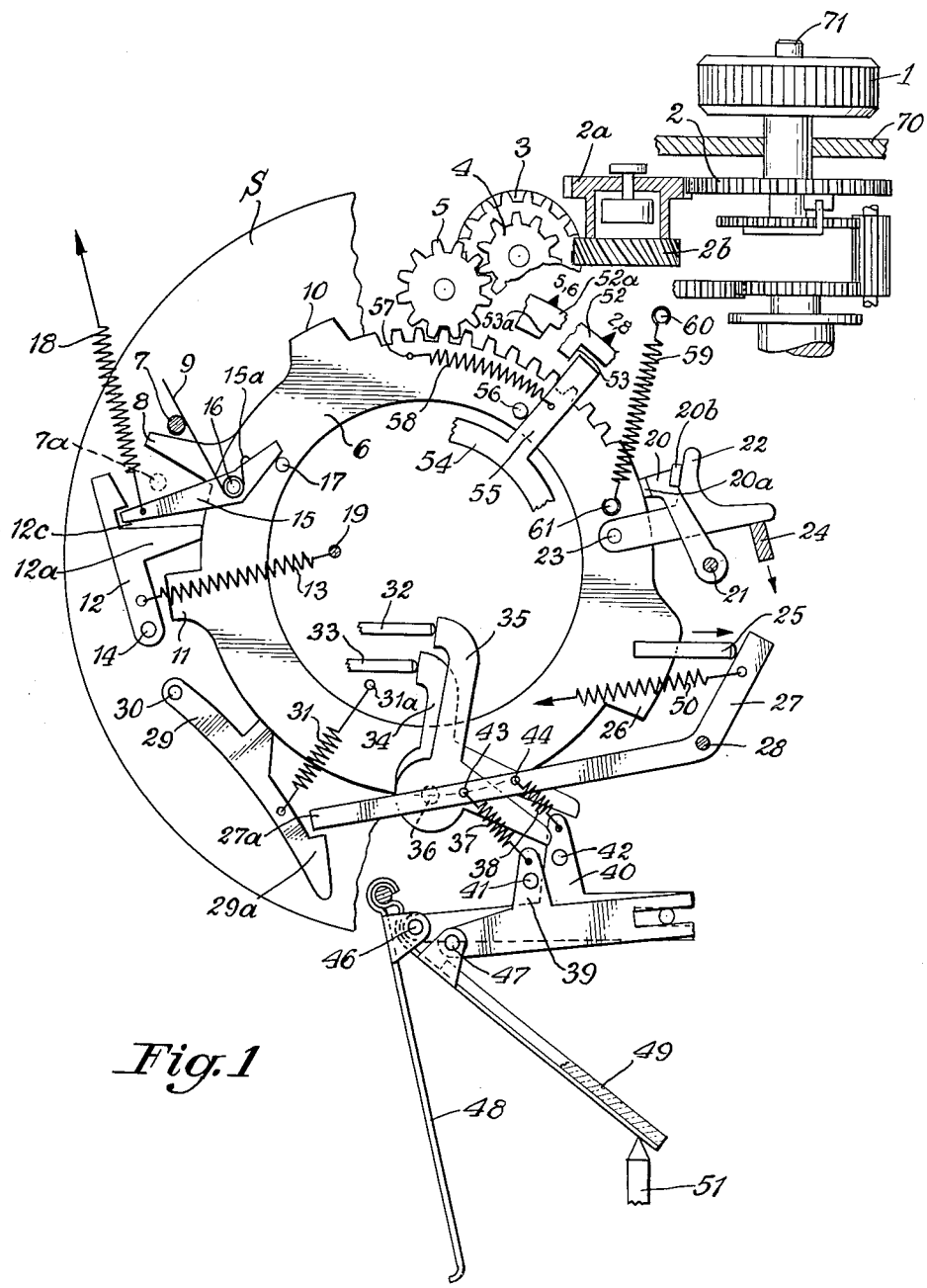

United States Patent Office 3,074,333  
Patented Jan. 22, 1963

3,074,333  
SINGLE LENS MIRROR REFLEX CAMERAS  
Johann Hahn and Edgar Sauer, Stuttgart, Germany, assignors to Zeiss Ikon Aktiengesellschaft, Stuttgart, Germany  
Filed Feb. 17, 1960, Ser. No. 9,269  
Claims priority, application Germany Feb. 20, 1959  
8 Claims. (Cl. 95—42)

The present invention relates to improvements in single lens mirror reflex cameras provided with a lens shutter.

It is an object of the invention to provide a single lens mirror reflex camera of the type mentioned with means which permit an observation of the object photographed in the finder immediately after the exposure has been made without the necessity of re-tensioning the shutter as it is necessary at the present-day single lens mirror reflex cameras.

In accordance with the present invention a novel control device is provided which permits in single lens mirror reflex cameras having a lens shutter an observation of the finder image between exposures, namely before the shutter is tensioned again for the next exposure. The design of this control device is such that when utilizing a shutter, the segments of which can be opened in tensioned and non-tensioned condition of the shutter, the mirror which is in condition for making an exposure is returned in its operative observation position and the shutter segments will be reopened again immediately after an exposure has been made.

According to a special feature of this invention the control device is operatively connected with the mirror, with the shutter segments and with the diaphragm in such a manner that in case the shutter is tensioned for making an exposure and the mirror is in its operative observation position, the control device will hold the shutter and the diaphragm in fully opened position, whereby upon a release of the shutter the control device will release said shutter and diaphragm for closing, while the return of the mirror and the opening of the shutter after the exposure will not influence the diaphragm which has been adjusted automatically to its preselection position when the shutter is in its untensioned condition so that the diaphragm can be readily manually adjusted within its conventional range or limits.

In accordance with a preferred embodiment of the invention the control ring is provided with control projections, control cams, control pins, levers, etc. which cooperate with parts of the shutter and with tensioning and latch levers during the rotation of the control ring in one direction and, after the opening of the shutter segments, the tensioning and latching of power storage means in the tensioning position. During the return rotation of the control ring and after the release of the shutter and completion of the exposure, these control elements cause the unlatching of the power storage means and thus will reopen the shutter segments and will return the mirror and the light protecting cover into their observation position. In known manner, a control stop for the control of the shutter segments is provided at the control ring. During the forward move of the control ring (in the direction of the shutter tensioning) same will pull the adjusting pin for the shutter segments in the position which corresponds to the opening position of the segments. During the return movement of the control ring, said adjusting pin will first be moved into its closing position by the control stop itself, or by a spring forming a fork with same. During the further return travel of the control ring said adjusting pin will be moved into the opening position of the segments by the first, in the meantime freed, power storage means.

In order to perform all of the above mentioned functions, the control ring is provided, in accordance with the present invention, with a tensioning lever for a first power storage means which has the form of a spring. The tensioning lever will tension said spring during the forward move of the control ring and will lock same in its tensioning position. In accordance with another feature of the invention, a latch lever which is rotatable about a stationary axis in the shutter housing, is used for this purpose. The tensioning lever will reach the actuating range of said latch lever during or at the end of the forward move of the control ring and will be locked in this position. The control ring is provided with a control cam for the unlocking of the first power storage means which will be actuated at the end of the return travel and will release the locking. The thus actuated first power storage means will move forward the tensioning lever connected with same and will engage the adjusting pin projecting in its movement range so as to control the segments, thus moving the same into their opening position.

These and other objects of the invention will now be described in detail on hand of the accompanying drawings which disclose one embodiment of the invention.

Figure 4:
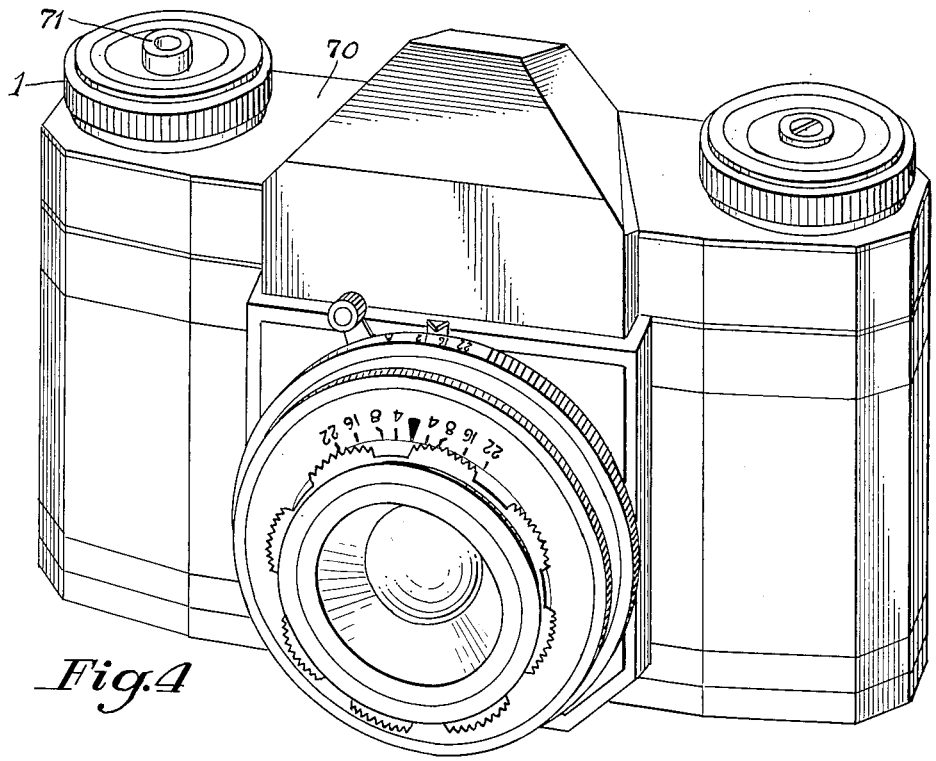
Figure 2:
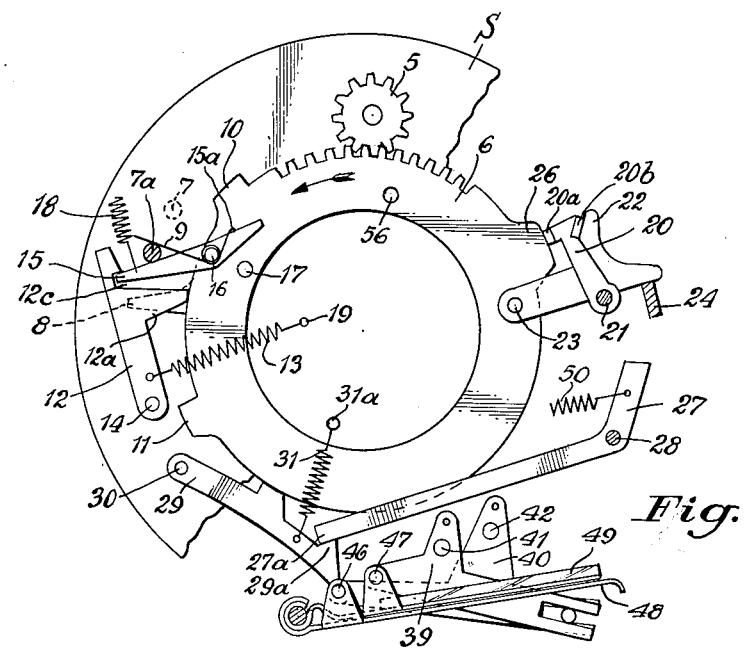
Figure 3:
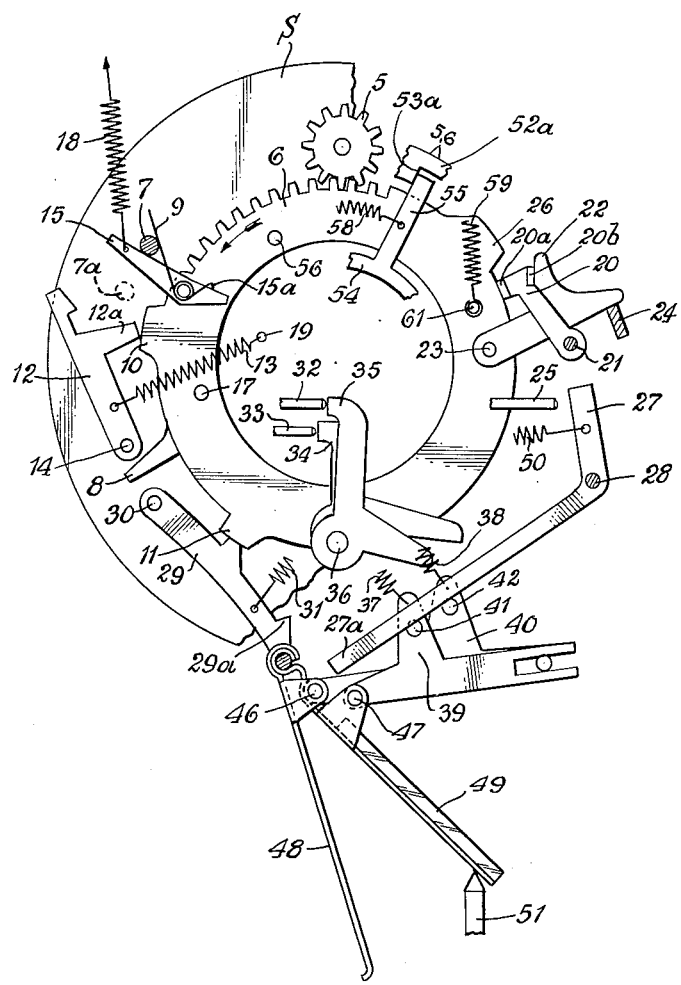
Figure 6:
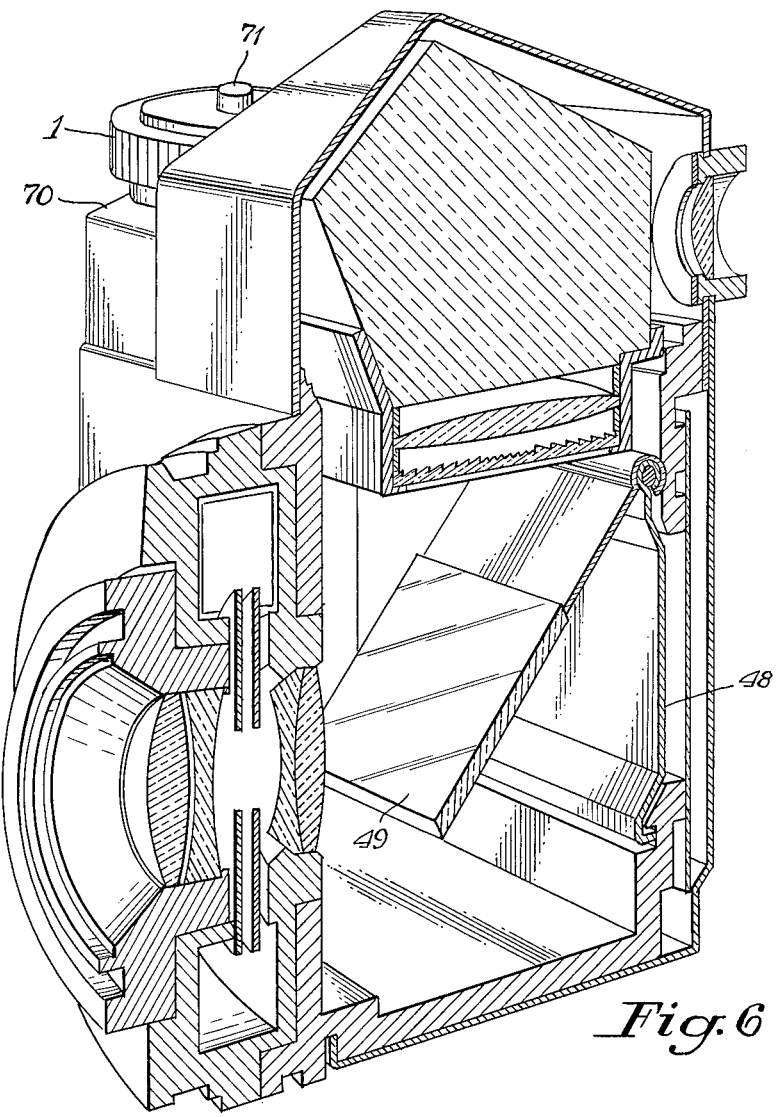
Figure 5B:
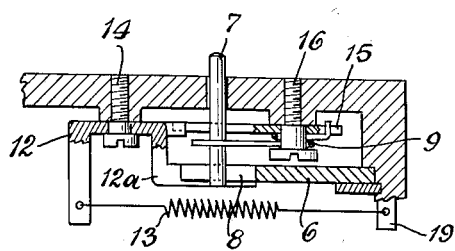
Figure 5A:
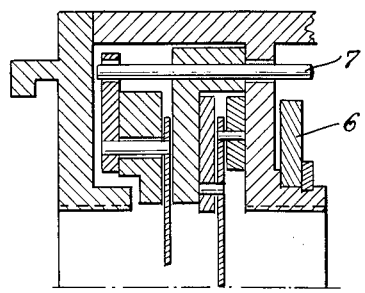

In the drawings:

FIG. 1 shows the position of certain parts of the camera when the shutter is tensioned, FIG. 2 shows the position of these parts at the moment the shutter is released, FIG. 3 shows the position of these parts after the shutter has assumed its released position, FIG. 4 shows a camera embodying the present invention, FIG. 5a illustrates an axial sectional view of one half of the shutter casing and its associated parts, FIG. 5b is another sectional view of the parts shown in FIG. 5a, and FIG. 6 illustrates a perspective view of the camera with one half of the same cut away to show the interior of the camera and the finder of the same.

In the drawings numeral 1 indicates a rotatable knob for the film advancing mechanism and the tensioning of the shutter of the camera 70 (FIG. 4). The knob 1 is provided in its center with a separately operable shutter release button 71. The knob 1 by means of a gear chain 2, 2a, 2b, 3, 4 and 5 actuates the control ring 6 provided in the shutter housing. The control ring 6 is rotated for control of the shutter segments and of the diaphragm segments. This control ring 6 is known per se; but until now it was used only for opening of the shutter segments and the diaphragm segments and for tensioning the shutter at the same time (rotation of the control ring 6 in one direction), and for closing of the shutter segments and the diaphragm segments, the latter to a preselected opening, immediately before the shutter release (during the return rotation of the control ring 6). In accordance with the preferred embodiment of the invention as shown in the drawings, the control ring 6 is also used as an additional control device for carrying out additional functions of the camera which are desired and form important objects of this invention, namely the opening of the shutter segments and the diaphragm segments, and also the return of the light protecting cover and the pivoted reflecting mirror into positions which permit an observation of the object photographed in the finder after the shutter has been released.

Numeral 7 indicates an adjusting pin for the control of the shutter segments. In the upper position of 7 the shutter segments are opened and in the lower position designated by 7a the segments are closed. 8 is a radially extending control projection on the ring 6. This projection is somewhat offset so as to engage only said adjusting pin 7, but it does not contact other parts which are in the path of its movement. 15 is an angular lever which is rotatable around a stationary pivot pin 16 attached to the shutter housing S. A spring 9 is placed around said pivot pin 16. One end of the spring 9 engages said adjusting pin 7 and the other end of the spring is attached to the lever 15 at 15a. 17 is a pin attached to one face of the control ring 6. One end of a spring 18 acting as a power storage means is fastened to one end of the angular lever 15 and serves for the additional opening of the segments. The other end of the spring 18 is attached to the shutter housing. A latch lever 12 rotatable about a pivot pin 14 is cooperating with the angular lever 15 and is pulled by a spring 13 with a lateral projection 12a against the circumferential edge of the control ring 6. One end of the spring 13 is attached to the latch lever 12 and the other end to the shutter housing at 19. The control ring 6 is also provided with a radially projecting cam 10 which is adapted to engage the latch lever 12 and which will lift the latch lever from its latched position with the angular lever 15. The ring 6 is furthermore provided with another control cam 11 at a corresponding position of the control ring 6 which will engage and cooperate with another latch lever 29 which will be described in detail in the following.

Numeral 54 indicates a piece of a diaphragm cage ring which is provided with a radial arm 55 comprising the diaphragm adjusting lever. This adjusting arm 55 is under the action of a spring 58 one end of which is attached at 57 to the shutter housing S. A pin 56 is attached near the arm 55 to one face of the control ring 6 and is adapted to engage and move the diaphragm adjusting lever 55. A portion of the diaphragm preselecting ring is designated with 52 and has thereon a radially inwardly directed projection 53 which is used as a stop for the diaphragm adjusting arm 55. While the position 52a, 53a of this diaphragm preselection ring corresponds to a preselected diaphragm aperture having, for instance, an opening 5, 6, the position at 52 and 53 corresponds to that of the largest possible diaphragm opening such as 2.8.

The control ring 6 is urged to rotate counterclockwise by a spring 59, one end of which is fastened at 61 to the control ring 6, while the other end is fastened to the shutter housing S at 60. A release device is designated by the numerals 20 to 24. A lever 20 which is rotatably supported with one end in the shutter housing at 21 has at its other end a surface 20a engaging the outer edge of the control ring 6, while another surface 20b at the same end of the lever 20 lies against a surface of a lever 22 rotatably supported at 23 to the shutter housing S. A release lever 24 engages another surface of the last named lever 22. This release device, known per se, is controlled by a radially extending cam 26 on the control ring 6.

An angular lever 27 is rotatable supported between its ends in the shutter housing S at 28 and is actuated by a lever 25 which in turn is controlled by the shutter tensioning and mirror and light cover operating gearing or a suitably shaped cam disc. Instead of the lever 25, which is controlled by the shutter tensioning and mirror and light cover operating gearing, another means provided on the ring 6 (such as a projection, lever, roller or similar) may be used for actuating the lever 27 for tensioning a power storage spring 50. While the lever 25 engages approximately one end of the angular lever 27, the other end 27a of the lever 27 is used as a latch element which cooperates with the already mentioned latch lever 29 which is rotatably supported with one end at 30. This latch lever 29 is pulled by means of a spring 31, one end of which is attached to the lever 29, against the circumferential edge of the control ring 6, thus providing a safe latch connection between the lever ends 27a and 29a. The other end of the spring 31 is attached at 31a to the shutter housing. The angular lever 27 has one end of the spring 50 attached thereto, which spring is used as a power storage for performing the additional return movement of the light cover shutter and of the pivoted mirror into a position in which the finder of the camera permits an observation of the object photographed. The other end of the spring 50 is fastened to the shutter housing. Numerals 34 and 35 indicate bell crank levers rotatable at 36 and used for the control of the pivoted mirror and light cover. The levers 34 and 35 are controlled by other levers or corresponding cams 32, 33 of the shutter tensioning and mirror and light cover control gearing and act against the levers 39 and 40 respectively, which are pivotally supported at 41 and 42 respectively. The levers 39 and 40 are used for actuating the light protecting cover 48 and the mirror 49, respectively. The operative connection of the last named levers 39, 40 with the parts of the light cover 48 and the mirror 49 to be moved is effected by the bearing pins 46 and 47. This arrangement is known per se and is controlled that always the correct sequence in the closing movement of the light protecting cover 48 and the swinging movement of the mirror 49 takes place. A stop 51 limits the downward movement of the mirror 49.

The angular lever 27 is operatively connected with the double levers 34, 35 and the pins 43 and 44. Furthermore, springs 37 and 38 are attached with one of their ends to the pins 43 and 44, while the other end of these springs is connected to the levers 39 and 40 which control the light protecting cover 48 and the pivoted mirror 49. These springs 37, 38 are tensioned together with the positioning of the parts 35, 36, 27, 39, 40, 48 and 49 produced by the tensioning of the shutter (observation positioned at the tensioned shutter) so that same can effect the upward movement of the released parts, namely the mirror and light cover, into their upper exposure position. After the exposure, i.e. after release of the shutter and after latching of 27 from the spring 50, which becomes active, the springs 37, 38 are ineffective. During the return movement of the light protecting cover 48 and the mirror 49 into the observation position, directly after the exposure, the full pulling force of the spring 50 will become effective.

The operation of the arrangement is as follows: During a rotation of the tensioning knob 1 the gear chain 2 to 5 drives the control ring 6 in a clockwise direction. This direction is also the direction in which the shutter is tensioned. As shown in FIG. 1, this rotation causes the control projection 8 to move the adjusting pin 7 for the shutter segments into its upper position so that the shutter segments will be fully open. In similar manner the diaphragm segments are fully opened because a movement of the control ring 6 in clockwise direction causes the pin 56 thereon to engage the diaphragm adjusting lever 55 and move it to a position in which the diaphragm is fully open.

When the control ring 6 is rotated in the clockwise direction, the double-armed angular lever 15 which is connected with the spring 18, will be pivoted by the pin 17 in a counterclockwise direction which will tension the spring 18. At the end of the movement of the angular lever 15 one end of the same will drop-in into a notch 12c of the latch lever 12 so that the spring 18 remains in its tensioned position.

During the mentioned rotation of the tensioning knob 1 the lever 25 and cams 32, 33 will be actuated in the direction indicated by arrows by the tensioning and control gearing of the mirror and light protecting cover. This will first cause the light protecting cover 48 and the mirror 49 to be moved by the lever 34, 35, 39 and 40 into a position which permits the observation of the finder image, while on the other hand the lever 27 will be rotated in clockwise direction. This will tension the spring 50 which is used as a power storage and later is used for the return of the mirror and light protecting cover. The spring 50 will be locked in its tensioned position by the engagement of the lever end 27a with the latching nose 29a of the lever 29. After termination of the shutter tensioning the control ring 6 is maintained or locked in the respective rotary position.

During the release of the shutter the control ring 6 will be unlatched for return travel and moves thereby in counterclockwise direction. Referring to FIG. 2, the end of the spring 9 engaging the pin 7 is first moved into its downward position and takes the pin 7 along with it which action will close the shutter segments. Furthermore, due to the counterclockwise moving pin 56 the diaphram adjusting lever 55 will be pulled by the spring 58 until it will engage the projection 53 of the diaphragm preselecting ring 52. This diaphragm preselecting ring 52 is provided with notches or is roughened up somewhat in order to provide the necessary resistance against further displacement after said engagement has been established. The control ring 6 will rotate to such an extent that the finally reached position of the pin 56 will correspond to the smallest diaphragm opening. The levers or cams 32, 33 will be returned by the gearing controlling the shutter tensioning and the light protecting cover and mirror so that the mirror and the light protecting cover will be able to reach the exposure position. At the same time said gearing will return the lever or cam 25 which was in engagement with one end of the angular lever 27.

The cam 26 on the control ring 6, which slidably engages the surface 20a of the lever 20, will deflect the lever connection 20, 22 which in turn will move the release lever 24 in the direction of the arrow and thereby will effect a release of the shutter.

After the shutter is released (FIG. 3), the control ring 6 will continue its counterclockwise movement until during its final movement it will release the two springs 18 and 50 so that the desired additional operations can take place after the shutter has run-off, namely a return of the light protecting cover and the mirror into their positions permitting an observation of the finder image including, of course, a reopening of the shutter segments. The unlatching of the spring 18 is effected by the control cam 10 when the latter reaches the lateral projection 12a of the latch lever 12 and thus will lift the same out of its latching position. The now active spring 18 will pull one end of the lever 15 upwardly which in turn will urge the adjusting pin 7 out of its position 7a into its upper position, and will thus open the shutter segments. The spring 50 is released by the control cam 11 when the latter is pushed underneath the gliding surface of the latch lever 29 and will thus release the connection between lever portions 27a and 29a. Since, as already stated, the lever 25 and the cams 32, 33 were returned by the action of the release means, which will return the tensioning, and control gearing for the light protecting cover and the mirror, the angular lever 27 which was released at 27a will be able to follow the spring 50 and will press the engaged lever mechanisms 34, 35, 39, 40 downwardly to move the light protecting cover and the mirror into the observation position.

The above described operations need not be effected by the control ring 6, but may also be effected by the segment holding ring of the shutter. This, however, would be disadvantageous because it would influence the shutter speed formation of the shutter which should be avoided.

A particularly advantageous feature of this invention is that after the release of the previously tensioned shutter the diaphragm segments remain in the preselected position, i.e. in the position in which the exposure was made. The user of the camera thus will be able to control the depth of field conditions which prevailed during the exposure and then evaluate the experience made for any additional exposures. In addition, it is possible, when manually adjusting the arrested diaphragm preselecting ring to adjust the diaphragm to any desired diaphragm value. After tensioning the shutter the diaphragm in known manner will be automatically adjusted to its full aperture.

The spring 9 which is arranged between the segment adjusting pin 7 and the double-armed lever 15, on one hand, and the springs 37 and 38 arranged between the angular lever 27 and the two control levers 41, 42 for the light protecting cover 48 and the pivoted mirror 49, on the other hand, are preferably arranged in such a manner that when the power storage means 18 and 50, respectively, become active, the springs and power storage means cannot act opposite to each other. When the power storage means become active to perform an appropriate control movement of the levers 15 and 27, respectively, the springs 9, 37 and 38 will be idle and will be inactive. In this manner a reduction in the action of the power storage means 18 and 50, respectively, at the time of their action is avoided.

What we claim is:

1. In a single lens mirror reflex camera, a finder provided with a pivoted mirror, a lens shutter, a manually rotatable shutter tensioning means, a manually operable shutter release means, an adjustable diaphragm, and a control device operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operated position in said finder after the completion of said exposure, a first power storage means for returning the mirror in said finder to its operative observation position after an exposure has been made, said power storage means comprising a spring which is tensioned when said shutter tensioning means is operated, means for locking said spring in this tensioned position, and a second power storage means including a second spring for opening the shutter after the exposure has been made and a second locking means for holding said second spring tensioned and operated by said shutter tensioning means.

2. In a single lens mirror reflex camera, a finder provided with a pivoted mirror, a lens shutter, a manually rotatable shutter tensioning means, a manually operable shutter release means, an adjustable diaphragm, and a control device operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operative position in said finder after the completion of said exposure, a first power storage means for returning the mirror in said finder to its operative observation position after an exposure has been made, said power storage means comprising a spring which is tensioned when said shutter tensioning means is operated, means for locking said spring in this tensioned postion, and a second power storage means including a second spring for opening the shutter after the exposure has been made and a second locking means for holding said second spring tensioned and operated by said shutter tensioning means, said control device including a rotatable ring provided with means for tensioning said two power storage springs when the shutter is tensioned, and control elements on said ring connecting the latter with said two power storage springs in such a manner that when said ring is rotated in one direction a tensioning of said power storage springs takes place, while said springs are untensioned when said ring rotates in the opposite direction.

3. In a single lens mirror reflex camera, a finder provided with a pivoted mirror, a lens shutter, a manually rotatable shutter tensioning means, a manually operable shutter release means, an adjustable diaphragm, and a control device including a rotatable ring arranged concentrically about the axis of said lens shutter, said ring being operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operative position in said finder after the completion of said exposure, an angular lever pivotally mounted about a fixed axis between its ends and adjacent a face of said rotatable ring, a spring connected to one end of said lever, said lever cooperating with a stop pin on said face of the ring in such a manner that upon rotation of said ring in one direction said spring is tensioned, and means for locking said spring in its tensioned position together with said lever.

4. In a single lens mirror reflex camera, a finder provided with a pivoted mirror, a lens shutter, a manually rotatable shutter tensioning means, a manually operable shutter release means, an adjustable diaphragm, and a control device including a rotatable ring arranged concentrically about the axis of said lens shutter, said ring being operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operative position in said finder after the completion of said exposure, an angular lever pivotally mounted about a fixed axis between its ends and adjacent a face of said rotatable ring, a spring connected to one end of said lever, said lever cooperating with a stop pin on said face of the ring in such a manner that upon rotation of said ring in one direction said spring is tensioned, and means for locking said spring in its tensioned position together with said lever, said last named means comprising a latch lever having a recess for receiving one end of said angular lever at the end of said rotation of said ring.

5. In a single lens mirror reflex camera, a finder provided with a pivoted mirror, a lens shutter, a manually rotatable shutter tensioning means, a manually operable shutter release means, an adjustable diaphragm, and a control device including a rotatable ring arranged concentrically about the axis of said lens shutter, said ring being operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operative position in said finder after the completion of said exposure, in which said rotatable ring is provided with a control cam for releasing a tensioned spring used for additional opening of the shutter, said ring having thereon a second control cam for releasing another tensioned spring for the additional return movement of the mirror and a light protecting cover.

6. In a single lens mirror reflex camera, a finder provided with a pivoted mirror, a lens shutter, a manually rotatable shutter tensioning means, a spring which is tensioned by said tensioning means, a manually operable shutter release means, an adjustable diaphragm, and a control device including a rotatable ring arranged concentrically about the axis of said lens shutter, said ring being operatively connected with said shutter tensioning means and including means for opening said shutter and said diaphragm for an observation of the object photographed in said finder immediately after said shutter release means has been operated and an exposure has been made, said means operating a mechanism which returns said pivoted mirror to its operative position in said finder after the completion of said exposure, said rotatable ring being rotated in one direction when said shutter tensioning means is operated and being rotated in the opposite direction when said shutter release means is operated and including a shutter adjusting pin which during the return rotation of said ring is engaged by a cam projection on said ring to cause a closing of the shutter, said tensioned spring being released by another cam on said ring after a release of the shutter to cause a reopening of said shutter.

7. A camera as claimed in claim 6, including a first power storage means for returning the mirror in said finder to its operative observation position after an exposure has been made, said power storage means comprising a spring which is tensioned when said shutter tensioning means is operated, means for locking said spring in this tensioned position, and a second power storage means including a second spring for opening the shutter after the exposure has been made, a second locking means for holding said second spring tensioned and operated by said shutter tensioning means, an angular lever which is used as a tensioning and locking member for said second spring, and means controlled by the shutter tensioning and mirror control means for operating said angular lever and move it into tensioning and locking position for said second spring when the shutter is tensioned.

8. A camera as claimed in claim 6, including a first power storage means for returning the mirror in said finder to its operative observation position after an exposure has been made, said power storage means comprising a spring which is tensioned when said shutter tensioning means is operated, means for locking said spring in this tensioned position, and a second power storage means including a second spring for opening the shutter after the exposure has been made, a second locking means for holding said second spring tensioned and operated by said shutter tensioning means, an angular lever which is used as a tensioning and locking member for said second spring, means controlled by the shutter tensioning and mirror control means for operating said angular lever and moving it into tensioning and locking position for said second spring when the shutter is tensioned, and a latch lever having a notch cooperating with said angular lever and adapted to receive in its notch said angular lever at the end of the tensioning of the shutter.

References Cited in the file of this patent

UNITED STATES PATENTS 2,730,025    Faulhaber               Jan. 10, 1956